US012766914B2

(12) United States Patent
Barbier et al.

(10) Patent No.: US 12,766,914 B2
(45) Date of Patent: Oct. 20, 2026

(54) DEVICE FOR THERMAL TREATMENT OF AIR FOR A VEHICLE WITH IMPROVED TEMPERATURE MANAGEMENT

(71) Applicant: VALEO SYSTEMES THERMIQUES, La Verriere (FR)

(72) Inventors: Thierry Barbier, La Verriere (FR); Cyril Gontier, La Verriere (FR); Yves Rousseau, La Verriere (FR)

(73) Assignee: Valeo Electrification, Cergy Pontoise (FR)

( * ) Notice: Subject to any disclaimer, the term of this patent is extended or adjusted under 35 U.S.C. 154(b) by 364 days.

(21) Appl. No.: 18/553,038

(22) PCT Filed: Mar. 31, 2022

(86) PCT No.: PCT/EP2022/058651

§ 371 (c)(1),
(2) Date: Sep. 28, 2023

(87) PCT Pub. No.: WO2022/207838

PCT Pub. Date: Oct. 6, 2022

(65) Prior Publication Data

US 2024/0174046 A1 May 30, 2024

(30) Foreign Application Priority Data

Mar. 31, 2021 (FR) ...................................... 2103367

(51) Int. Cl.
*B60H 1/00* (2006.01)

(52) U.S. Cl.
CPC ..... *B60H 1/00564* (2013.01); *B60H 1/00671* (2013.01)

(58) Field of Classification Search
CPC ............ B60H 1/00564; B60H 1/00671; B60H 1/00042; B60H 1/00057; B60H 1/00321; B60H 2001/00121

(Continued)

(56) References Cited

U.S. PATENT DOCUMENTS 6,758,260 B2 * 7/2004 Clifford ............. B60H 1/00678 237/12.3 A
7,134,487 B2 11/2006 Kachi (Continued)

FOREIGN PATENT DOCUMENTS

CN 108001160 A 5/2018
DE 10118497 A 10/2002

(Continued)

OTHER PUBLICATIONS

Japan Patent Office, Office Action (with English translation) of corresponding Japanese Patent Application No. 2023-560522, dated Dec. 24, 2024, 10 pages.

(Continued)

*Primary Examiner* — Avinash A Savani
*Assistant Examiner* — Ryan L Faulkner
(74) *Attorney, Agent, or Firm* — Valeo Electrification

(57) ABSTRACT

The invention relates to a device for thermal treatment of air for a vehicle, including a conveying duct, a heating duct and a mixing chamber. A mixing device is configured to be able to move between a first end position, which prevents air from circulating between the conveying duct and the mixing chamber, and a second end position, which prevents the air from circulating in the heating duct. The mixing device includes a main flap and a deflection element projecting from the main flap, the deflection element including at least one front rib and at least one lateral rib extending one end of the front rib.

20 Claims, 6 Drawing Sheets

(58) Field of Classification Search
USPC .......................................................... 454/148
See application file for complete search history.

(56) References Cited

U.S. PATENT DOCUMENTS

| | | | | |
|---|---|---|---|---|
| 7,238,102 | B2 * | 7/2007 | Goupil, Jr. | B60H 1/00692 454/121 |
| 7,475,720 | B2 | 1/2009 | Kusaka | |
| 7,798,207 | B2 | 9/2010 | Tarukawa | |
| 9,434,233 | B2 | 9/2016 | Hara | |
| 9,476,520 | B2 | 10/2016 | Haupt et al. | |
| 2005/0124284 | A1 | 6/2005 | Newman et al. | |
| 2006/0025063 | A1 * | 2/2006 | Burr | B60H 1/00664 454/69 |
| 2010/0224253 | A1 * | 9/2010 | Azar | B60H 1/00678 454/333 |
| 2015/0174987 | A1 * | 6/2015 | Lee | B60H 1/0005 454/155 |

FOREIGN PATENT DOCUMENTS

| | | | |
|---|---|---|---|
| DE | 10147112 | A1 | 4/2003 |
| EP | 3450226 | A1 | 3/2019 |
| GB | 2404011 | A | 1/2005 |
| JP | 2005035375 | A | 2/2005 |
| JP | 2006137295 | A | 6/2006 |
| JP | 2018027722 | A | 2/2018 |
| JP | 2020011732 | A | 1/2020 |
| KR | 20150088456 | A | 8/2015 |

OTHER PUBLICATIONS

Japan Patent Office, Search Report (with English translation) of corresponding Japanese Patent Application No. 2023-560522, dated Dec. 26, 2024, 25 pages.
European Patent Office, International Search Report (with English translation) and Written Opinion of corresponding International Application No. PCT/EP2022/058651, dated Jun. 1, 2022.
China Patent Office, First Office Action (with English translation) of corresponding Chinese Patent Application No. 202280036859.0, dated Apr. 8, 2026, 15 pages.

* cited by examiner

DEVICE FOR THERMAL TREATMENT OF AIR FOR A VEHICLE WITH IMPROVED TEMPERATURE MANAGEMENT

TECHNICAL FIELD

The present invention pertains to the field of thermal treatment of air in vehicles, in particular motor vehicles. More specifically, the invention relates to a device for thermal treatment of air in a vehicle passenger compartment comprising means for ventilating, heating and/or cooling the air in the passenger compartment and thus adjusting the temperature of said passenger compartment.

BACKGROUND OF THE INVENTION

Devices for thermal treatment of air in vehicles comprise a casing, the walls of which are provided with apertures delimiting air inlets and outlets and inside which the air is routed through various thermal treatment members. More particularly, the walls of the casing form ducts, some of which contain an evaporator for cooling the air and a radiator for heating the air.

Such devices are generally equipped with adjustable shutters for adjusting the flow rates of cold air from the evaporator and the flow rates of hot air from the radiator and thereby regulating the temperature of the air resulting from the mixing of the hot air and cold air. The air at the regulated temperature is then guided toward the passenger compartment, for example toward a glazed surface or toward an area where the feet of a user of the vehicle can be.

These devices can also include a mixing flap movable between a first end position configured such that only hot air flows toward the air outlets and a second end position configured such that only cold air flows toward the air outlets. The mixing flap can take up intermediate positions between these two end positions, which allow different portions of hot air and cold air to be mixed. It is thus possible to obtain better control over the temperature of the air destined for the vehicle passenger compartment.

One disadvantage of these solutions is that the change in temperature obtained according to the various positions of the flap is not as smooth as possible. This results in thermal discomfort for the user(s) of the vehicle.

Another disadvantage is that there is always a temperature gradient between the various air outlets and therefore between various areas of the passenger compartment, for example between an area at the windshield of the vehicle and an area at the feet of a user of the vehicle.

BRIEF SUMMARY OF THE INVENTION

The aim of the present invention is to overcome at least one of the aforementioned disadvantages, as well as to afford other advantages by proposing a new type of device for thermal treatment of air for a vehicle, in particular a motor vehicle, and more specifically for a passenger compartment of said vehicle.

The present invention proposes an air thermal treatment device for a vehicle, in particular a motor vehicle, including a casing comprising a conveying duct, a heating duct and a mixing chamber which are formed by walls of the casing and are configured to place at least one air inlet opening of the casing and at least one air outlet opening of the casing in aeraulic communication. The conveying duct extends from the inlet opening to the mixing chamber and the heating duct extends parallel to the conveying duct as far as the mixing chamber. The air thermal treatment device further comprises a mixing device configured to be movable between a first end position which prevents the circulation of air between the conveying duct and the mixing chamber, such that the air is intended to circulate in the heating circuit, and a second end position which prevents air from circulating in the heating duct. The mixing device comprises a main flap adapted to be rotatable about an axis of rotation. According to the invention, the mixing device comprises a deflection element protruding from an upper face of said main flap. The deflection element comprises at least one front rib lying in a plane comprising the axis of rotation and at least one lateral rib extending one end of the front rib and lying in a plane perpendicular to the axis of rotation.

A heating device can in particular be arranged in the heating duct and configured to heat the air circulating in the heating duct.

The upper face is thus named with reference to the orientation that the flap has in the casing when it is installed in the vehicle, the upper face of the flap facing away from the road on which the vehicle is traveling. The upper face is in particular the face of the main flap which contributes to delimiting the area in which air flows within the conveying duct when the main flap is in the second end position and when most, if not all of the air flow is circulating in the conveying duct. The upper face can thus be defined as the face of the main flap that faces away from the heating duct, whereas the other face of the main flap, the lower face opposite the upper face, faces the heating duct.

The front rib obstructs the laminar flow of air on the upper face, thus causing a change in the type of air flow. The air flow thus changes from laminar to turbulent. The air will therefore be swirling as it enters the mixing chamber, resulting in better mixing of the air coming from the conveying duct and the air coming from the heating duct.

According to one embodiment, the lateral rib is substantially perpendicular, preferably strictly perpendicular, to the front rib viewed in projection in a plane comprising the axis of rotation.

Here, and throughout the following text, the term "substantially" should be understood to mean within manufacturing tolerances, and any assembly tolerances there might be.

According to one embodiment, the upper face is configured to face the mixing chamber. In other words, the upper face faces the mixing chamber whatever the position of the main flap and therefore whatever the position of the mixing device. As stated above, the upper face, conversely, faces away from the heating duct, whatever the position of the mixing device.

According to one embodiment, the main flap comprises a first free edge extending parallel to the axis of rotation and being closer to the inlet opening than a second free edge of the main flap that is opposite the first free edge, the front rib being in the vicinity of the first free edge of the main flap. The proximity of the first free edge and the second free edge to the inlet opening must in particular be considered in a plane perpendicular to the axis of rotation.

In other words, the first free edge of the main flap is arranged upstream of the second free edge relative to the air flow. The first free edge is thus the first to be in contact with the air. In this context, each lateral rib as previously mentioned extends from the front rib toward the second free edge.

According to one embodiment, the lateral rib extends continuously from the end of the front rib to the vicinity of the second free edge of the main flap.

According to one embodiment, the main flap comprises a shaft configured to allow rotation of the main flap about the axis of rotation and arranged between the first free edge and the second free edge of the main flap, the lateral rib passing through the shaft viewed in projection in a plane comprising the axis of rotation.

According to one embodiment, the lateral rib extends over at least 80% of the length of the upper face of the main flap. This ratio between the length of the lateral rib and the length of the upper face is considered in a projection plane comprising the axis of rotation, the lengths being measured along an axis perpendicular to the axis of rotation.

According to one embodiment, the front rib extends over no more than 25% of the width of the upper face of the main flap. The width of the upper face is measured from a first end of the first free edge of the main flap to a second end of the first free edge along an axis parallel to the axis of rotation and included in a plane comprising the axis of rotation.

According to one embodiment, a plane of extension of the front rib has an angle of inclination with respect to a plane of extension of the upper face of the main flap. One of the technical effects of this feature is to reduce or even eliminate the noise that would be generated by the air flow hitting against a wall perpendicular to the path of the air flow. The inclination of this front rib helps to form a ramp which deflects the air flow, for example to send it to an area of the casing other than the mixing chamber into which the air is directed and allow a continuous supply to a defrosting air outlet without passing through this mixing chamber, and which creates a disturbance in the air flow allowing the part of the flow passing through the mixing chamber to mix more quickly with the air present elsewhere in this mixing chamber. The inclination of this front rib is also calculated in such a way as to offer these advantageous features while limiting pressure losses in the air flow, so as to avoid impairing the performance of the thermal treatment device.

According to one embodiment, the angle of inclination is between 50° and 80°. The angle of inclination is measured in the anticlockwise direction from the plane of extension of the upper face of the main flap to the plane of extension of the main rib viewed in projection in a plane perpendicular to the axis of rotation of the main flap. The inventors were able to determine by calculation that these values offered a good compromise between noise reduction, an acceptable pressure loss, and the degree of turbulence of the air flow.

According to one embodiment, the lateral rib is a first lateral rib and the deflection element comprises a second lateral rib protruding from the upper face of the main flap, the second lateral rib extending another end of the front rib and lying in a plane perpendicular to the axis of rotation. In this context, it will be appreciated that the first lateral rib and the second lateral rib are substantially parallel and that the deflection element has a U shape in a plane comprising the axis of rotation.

According to one embodiment, the main flap comprises a plurality of deflection elements extending at a distance from one another along an axis parallel to the axis of rotation. The deflection elements are arranged next to one another along an axis parallel to the axis of rotation, each deflection element being spaced from an adjacent deflection element, in such a way as to form a circulation duct in which the air can circulate between two adjacent deflection elements. In other words, the lateral ribs of the deflection elements are parallel to one another and form corridors through which the air can rush. This results in acceleration of the air in the region of the lateral ribs. The air thus reaches the mixing chamber more quickly, simplifying mixing of the various air flows present in this mixing chamber.

According to one embodiment, the front ribs of the plurality of deflection elements are aligned with one another along an axis parallel to the axis of rotation.

According to one embodiment, the plurality of deflection elements includes a central deflection element comprising a second lateral rib protruding from the upper face of the main flap, the second lateral rib extending another end of the front rib and lying in a plane perpendicular to the axis of rotation. The central deflection element is arranged centrally within the plurality of deflection elements. In other words, on either side of its lateral ribs, the central deflection element is surrounded by as many deflection elements.

According to one embodiment, the plurality of deflection elements comprises at least two end deflection elements which each consist of a front rib and a lateral rib, the other deflection elements of the plurality of deflection elements being arranged between the two end deflection elements. It is deduced from this configuration that these end deflection elements have an L shape viewed in projection in a plane comprising the axis of rotation.

According to one embodiment, each end deflection element is arranged in the vicinity of a lateral edge of the main flap, the lateral edges of the main flap connecting the ends of the first and second free edges of the main flap, each free end of the front rib of each end deflection element being closest to one of the lateral edges.

According to one embodiment, the main flap has a plane of symmetry perpendicular to the axis of rotation of the main flap.

According to one embodiment, the mixing device comprises an additional flap, a proximal edge of which is hinged at the first free edge of the main flap and a distal edge of which, opposite the proximal edge, engages slidingly in a guide formed in a wall of the casing.

The invention also relates to a vehicle, in particular a motor vehicle, comprising a passenger compartment delimited in part by a glazed surface and an air thermal treatment device according to the invention, in which at least one air outlet opening of the air thermal treatment device is configured to supply a channel adapted to guide air toward the glazed surface and in which at least one air outlet opening is configured to guide air toward the feet of at least one user of said vehicle.

BRIEF DESCRIPTION OF THE DRAWINGS

Further features and advantages of the invention will become more apparent from the following description, and also from a plurality of exemplary embodiments that are given by way of nonlimiting indication with reference to the appended schematic drawings, in which.

DETAILED DESCRIPTION OF THE INVENTION

It should first of all be noted that although the figures set out the invention in detail for its implementation, they can, of course, be used to better define the invention if necessary. It should also be noted that, in all of the figures, elements that are similar and/or perform the same function are indicated by the same numbering.

In the following description, a direction of a longitudinal axis L, a direction of a transverse axis T, and a direction of a vertical axis V are represented by a trihedron (L, T, V) in the figures.

Figure 1:
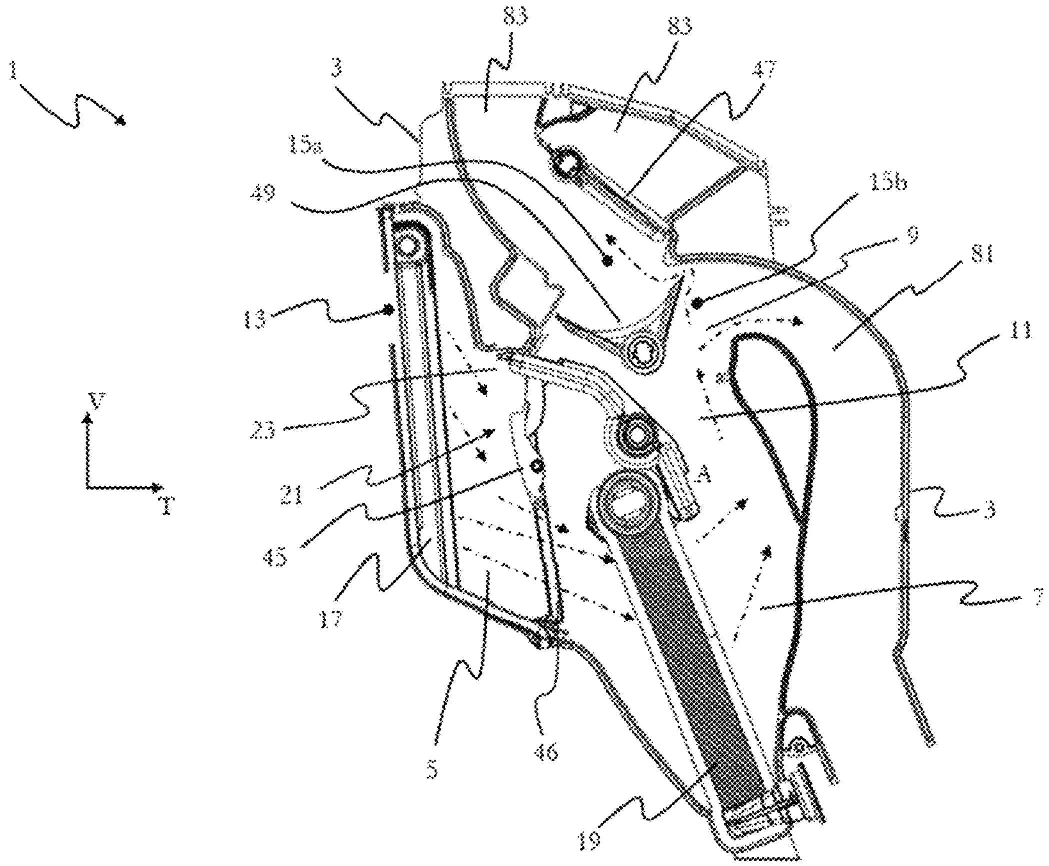
FIG. 1 schematically depicts, in a transverse and vertical sectional plane, a thermal treatment device according to the invention comprising a mixing device in a first end position.
Figure 2:
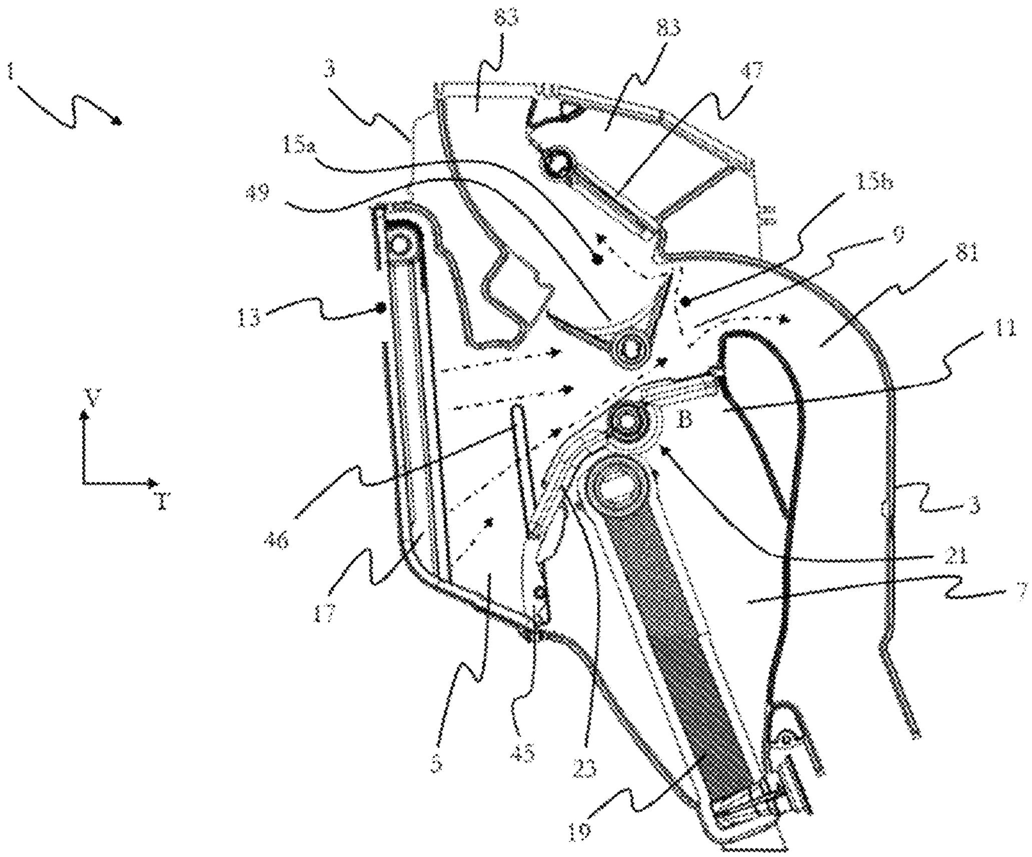
FIG. 2 schematically depicts the thermal treatment device of FIG. 1, with the mixing device in a second end position.
Figure 3:
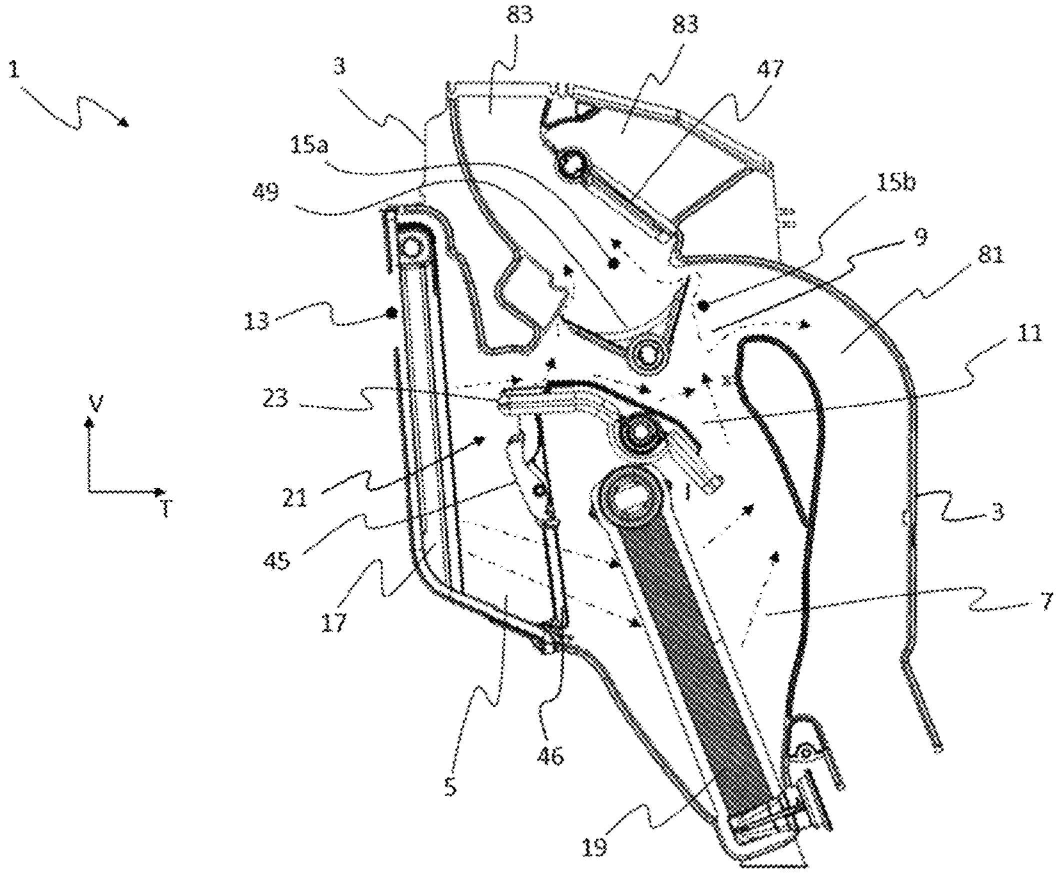
FIG. 3 schematically depicts the thermal treatment device of FIG. 1, with the mixing device in an intermediate position between the first end position and the second end position.

FIGS. 1-3 illustrate a device 1 for thermal treatment of air in a passenger compartment of a vehicle according to the present invention, in different configurations. The thermal treatment device 1 is configured to ventilate, heat and/or cool the air in the passenger compartment of the vehicle. Thus, it is possible to adjust the temperature of the passenger compartment, for example in response to a request from a user of the vehicle.

Referring to FIGS. 1-3, the thermal treatment device 1 includes a casing 3 comprising a conveying duct 5, a heating duct 7, at least one distribution duct 9 and a mixing chamber 11 which are formed by walls of the casing 3. The conveying duct 5, the heating duct 7, the distribution duct 9 and the mixing chamber 11 are arranged to place at least one air inlet opening 13 of the casing 3 and at least one air outlet opening 15*a*, 15*b* of the casing 3 in aeraulic communication.

The conveying duct 5 extends from the inlet opening 13 to the mixing chamber 11. The conveying duct 5 is configured to guide at least part of the air entering through the inlet opening 13 to the mixing chamber 11. An evaporator 17 is arranged in the conveying duct 5. The evaporator 17 is configured to cool and dry the air passing through said evaporator 17.

A ventilation member, not visible in FIGS. 1-3, can be arranged in the vicinity of the inlet opening 13. The ventilation member is configured to generate a flow of air in the direction from the air inlet opening 13 of the casing 3 toward the outlet opening 15*a*, 15*b* of the casing 3. The ventilation member is for example a centrifugal fan. An air filter, not visible in the figures, can be arranged between the ventilation member, not shown, and the evaporator 17.

The heating duct 7 extends parallel to the conveying duct 5 as far as the mixing chamber 11. The heating duct 7 is thus arranged as a branch of the conveying duct 5. A heating device 19 is arranged in the heating duct 7 and configured to heat the air circulating in the heating duct 7.

In an embodiment not shown, an additional heating device, for example of PTC type, is arranged in the heating duct 7 between the heating device 19 and the mixing chamber 11.

The mixing chamber 11 places the conveying duct 5, the heating duct 7 and the distribution duct 9 in communication. The mixing chamber 11 allows the air leaving the conveying duct 5 and the air leaving the heating duct 7 to mix in order to obtain a desired temperature of the air intended for the passenger compartment. Thus, the conveying duct 5 and the heating duct 7 and the mixing chamber 11 have a common junction.

As shown in FIGS. 1-3, a mixing device 21 is arranged in the casing, and in particular inside the conveying duct, upstream of the mixing chamber with respect to the direction of circulation of air likely to be circulating in the conveying duct 5. The mixing device 21 is configured to be movable between a first end position A, shown in FIG. 1, which prevents air from circulating in the conveying duct 5 toward the mixing chamber 11, and a second end position B, shown in FIG. 2, which prevents air from circulating toward the heating duct 7.

In other words, in the first end position, the air is directed toward the heating duct such that the first end position of the main flap corresponds to a heating function of the thermal treatment device. And in the second end position, the air is directed toward the mixing chamber, passing only through the conveying duct 5, avoiding the heating circuit, such that the second end position of the main flap corresponds to a ventilation and/or air-conditioning function of the thermal treatment device.

The mixing device 21 can also take up at least one intermediate position I, shown in FIG. 3, between the first end position A and the second end position B and in which one part of the air flow is directed toward the mixing chamber via the heating duct 7 and another part of the air flow is directed toward the mixing chamber via the conveying duct 5. It is thus possible to change the temperature of the air flow present in the mixing chamber 11 according to the desired temperature in the passenger compartment, by adjusting the quantity of cold air entering the mixing chamber and the quantity of hot air entering this same mixing chamber.

Figure 4:
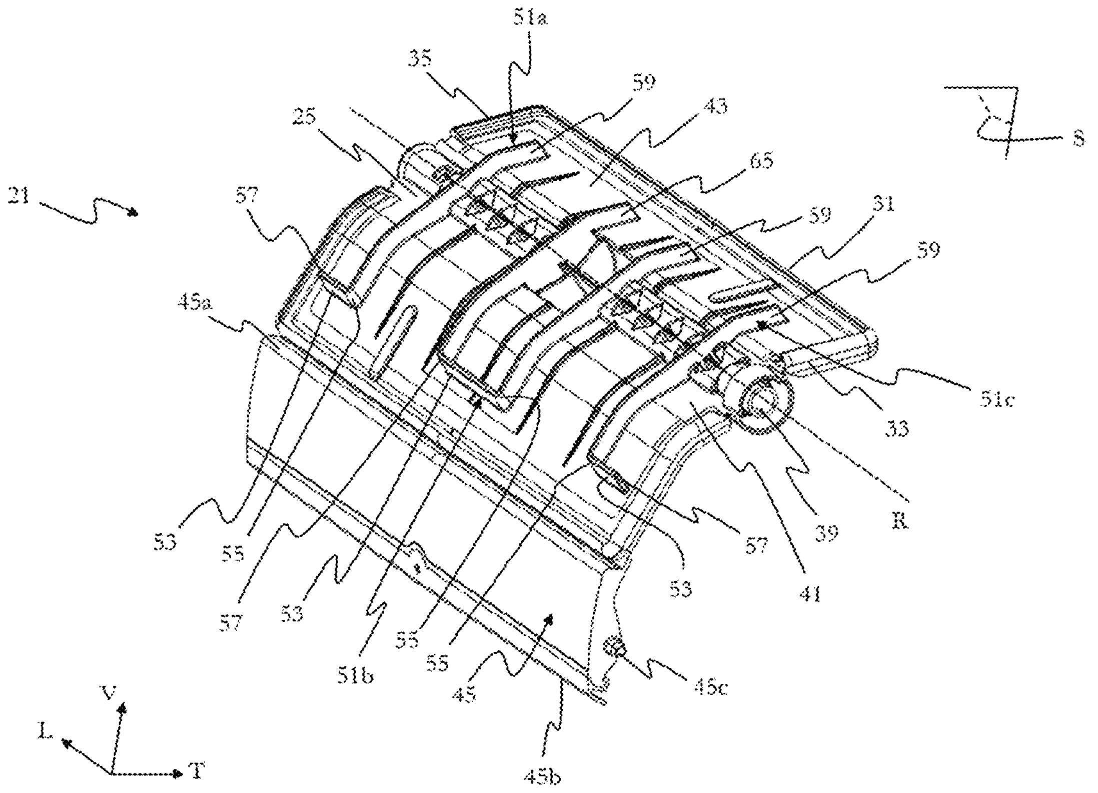
FIG. 4 is a schematic perspective view of the mixing device of FIG. 1 to 3.
Figure 5:
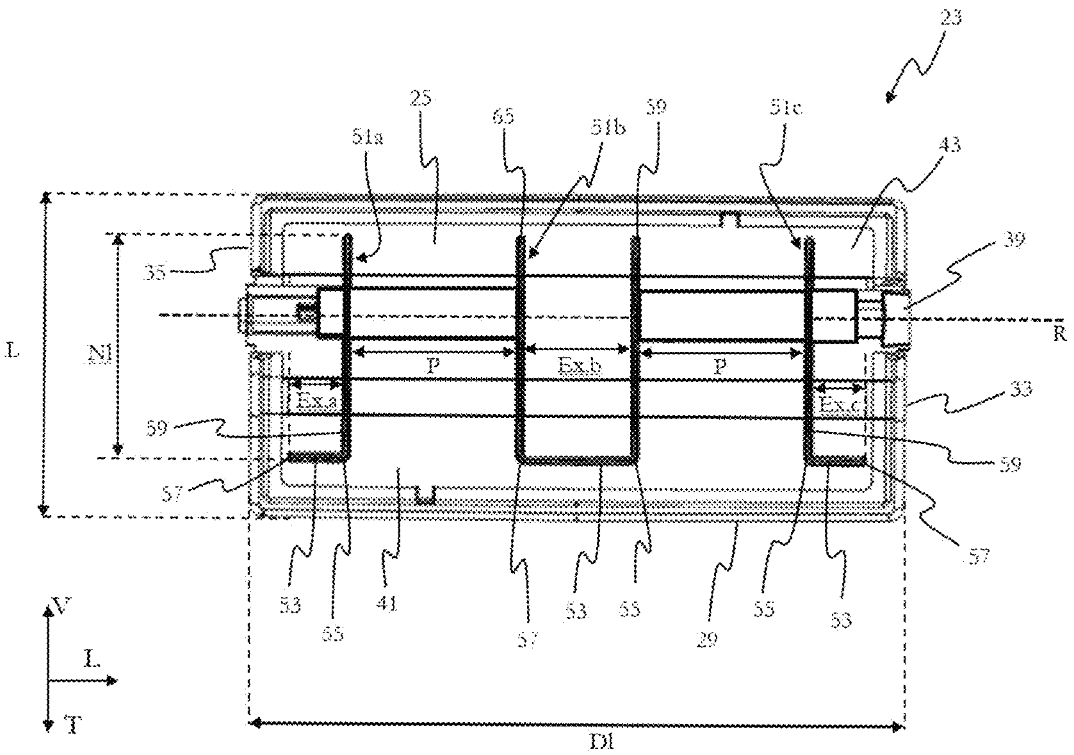
FIG. 5 schematically depicts, in projection in a longitudinal and transverse plane, a main flap of the mixing device of FIG. 4.
Figure 6:
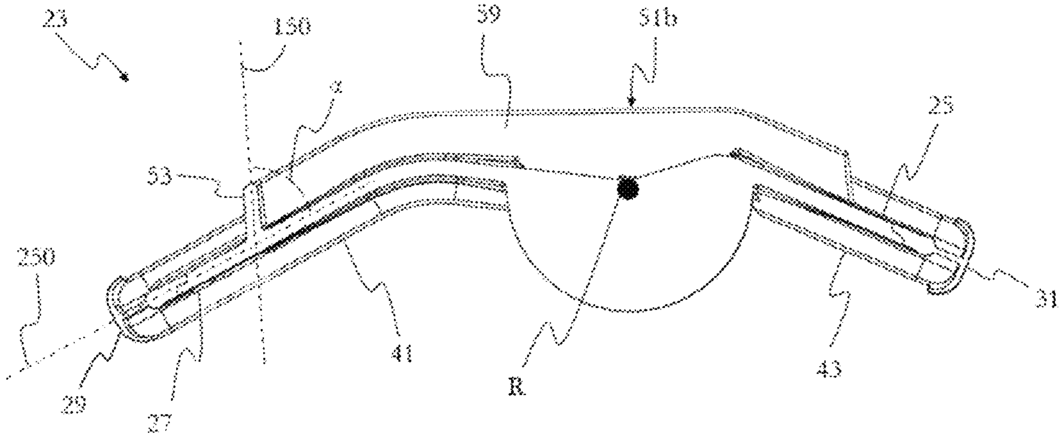
FIG. 6 schematically depicts the main flap, in section in a plane perpendicular to the axis of rotation.

With reference to FIGS. 4, 5 and 6, the mixing device 21 comprises a main flap 23 formed by a shaft 39 and two wings 41, 43 which extend from the shaft 39. The shaft 39 is configured to allow the main flap 23 to be rotatable about an axis of rotation R. The axis of rotation R, which in this case extends in the longitudinal direction L, is perpendicular to a general direction of air flow along the mixing device 21.

Each wing 41, 43 has a free edge which extends along an axis substantially parallel to the shaft 39 and therefore to the axis of rotation R. The free edges of the wings are opposite one another with respect to the shaft 39. One of the free edges of the wings 41, 43 forms a first free edge 29 of the main flap 23 and another of the free edges of the wings 41, 43 forms a second free edge 31 of the main flap 23. Note that the first free edge 29 of the main flap 23 is opposite the second free edge 31 of the main flap 23.

The ends of the first free edge 29 of the main flap 23 are connected to the ends of the second free edge 31 of the main flap 23 by lateral edges 33, 35 which extend along an axis substantially perpendicular to the axis of rotation R. The lateral edges 33, 35 of the main flap 21 are formed by lateral edges of the wings 41, 43 and a portion of the shaft 39.

Arbitrarily, the first free edge 29 of the main flap 23 is arranged upstream of the air flow in the region of the mixing device 21 and the second free edge 31 is downstream of said air flow. In other words, the first free edge 29 is closer to the inlet opening 13 than the second free edge 31 viewed in a plane comprising the axis of rotation R.

The two wings 41, 43 and the shaft 39 each have an upper face which together form the upper face 25 of the main flap 23 and each have a lower face which together form a lower face 27 of the main flap 23 which is opposite the upper face 25 of the main flap 23. The main flap 23 is configured such that the upper face 25 always faces the mixing chamber 11 whatever the position A, B, I of the mixing device 21.

Note also that the lower face of the main flap, that is to say the lower face of the wings and of the shaft participating in constituting the main flap, faces the heating duct. In this context, in the second end position, visible in FIG. 2, the upper face 25 of the main flap helps to delimit the path for the passage of air in the conveying duct 5 toward the mixing chamber.

Without this limiting the invention, the mixing device 21 can also include an additional flap 45 hinged on the main flap to extend the latter and help close off the heating duct, this additional flap being visible in particular in FIGS. 1-4. The additional flap 45 comprises a proximal edge 45*a* which is hinged to the first free edge 29 of the main flap 23 and a distal edge 45*b*, opposite the proximal edge 45*a*. The distal edge 45*b* comprises a pin 45*c* which engages slidingly in a guide 46 formed in a wall of the casing 3.

In accordance with the invention, and in particular with reference to FIGS. 4, 5 and 6, the mixing device 21 comprises at least one deflection element 51*a*, 51*b*, 51*c*. More particularly, in the embodiment illustrated in FIGS. 4 and 5, the mixing device 21 comprises a plurality of deflection elements 51*a*, 51*b*, 51*c*, namely a first end deflection element 51*a*, a second end element 51*c* and a central deflection element 51*b*. The deflection elements 51*a*, 51*b*, 51*c* protrude from the upper face 25 of the main flap 23.

The first end deflection element 51*a* and the second end deflection element 51*c* each comprise a front rib 53 lying in a longitudinal plane parallel to the axis of rotation R and a lateral rib 59 extending a first end 55 of the front rib 53 and lying in a plane perpendicular to the axis of rotation R. These end deflection elements each comprise a single lateral rib such that the second end 57 of the front rib 53 is free.

The first end deflection element 51*a* and the second end deflection element 51*c* each therefore have an L shape viewed in projection in the main elongation plane of the upper face 25 of the main flap.

The first end deflection element 51*a* is arranged in the vicinity of a lateral edge 33 of the main flap 23. The front rib 53 of the first end deflection element 51*a* is substantially perpendicular to the first lateral edge 33 of the main flap 23. The second end 57 of the front rib of the first end deflection element 51*a* is closer to the lateral edge 33 of the main flap 23 than the first end 55 of the front rib 53 extended by the lateral rib 59.

The second end deflection element 51*c* is arranged in the vicinity of a second lateral edge 35 of the main flap 23. The front rib 53 of the second end deflection element 51*c* is substantially perpendicular to the second lateral edge 35 of the main flap 23. The second end 57 of the front rib of the second end deflection element 51*c* is closer to the second lateral edge 35 of the main flap 23 than the first end 55 of the front rib 53 of the second end deflection element 51*c* extended by the lateral rib 59.

The central deflection element 51*b* differs from the elements previously described in that it comprises a front rib 53 lying in a plane parallel to the axis of rotation R and two lateral ribs 59, 65 each extending one end of the front rib 53 of the central deflection element 51*b*. The two lateral ribs 59, 65 of the central deflection element lie respectively in a plane perpendicular to the axis of rotation R. Thus, the central deflection element 51*b* is such that the two lateral ribs 59, 65 are substantially parallel to one another and substantially perpendicular to the front rib 53. In this embodiment, the central deflection element 51*b* has a U shape viewed in projection in the main elongation plane of the upper face 25 of the main flap.

For each deflection element 51*a*, 51*b*, 51*c*, the front rib 53 is formed on the wing 41 bearing, at one end, the first free edge 29 of the main flap 23 and this front rib 53 is arranged in the vicinity of this first free edge 29. In other words, the front rib 53 of each deflection element 51*a*, 51*b*, 51*c* is closer to the first free edge 29 of the main flap 23 than to the second edge 31 of the main flap 23, and more particularly, this front rib 53 of each deflection element 51*a*, 51*b*, 51*c* is closer to the first free edge 29 than to the shaft 39 separating the two wings 41, 43 from one another.

In FIG. 5, the front ribs 53 of each deflection element 51*a*, 51*b*, 51*c* are aligned with one another along an axis parallel to the axis of rotation R. Thus, the air flow likely to encounter the deflection elements when it circulates along the main flap, in particular in the second end position or an intermediate position, is in contact substantially simultaneously with each of the front ribs.

The front rib 53 of each deflection element 51*a*, 51*b*, 51*c* extends over no more than 25% of the width DI of the upper face 25 of the main flap 23. In other words, a dimension of extension of the front rib 53 of each deflection element 51*a*, 51*b*, 51*c* is equal to or less than 25% of the width DI of the upper face 25 of the main flap 23, it being understood that these dimensions are in this case considered in the longitudinal direction parallel to the axis of rotation R.

In FIG. 5, note that the width DI is measured from one lateral edge of the main flap to the other, and that the dimension of extension Ex of a front rib 53 of a deflection element 51*a*, 51*b*, 51*c* is measured from one end 55 to the other end 57 of this front rib 53, these two dimensions being measured along an axis parallel to the axis of rotation R.

Note that these embodiments are not limiting on the invention provided that, as mentioned above, a dimension of extension of the front rib 53 of each deflection element 51*a*, 51*b*, 51*c* is equal or less than 25% of the width DI of the upper face 25 of the main flap 23. Each deflection element could for example have a front rib having a dimension of extension different from the dimensions of extension of the other front ribs.

The front ribs 53 of the deflection elements 51*a*, 51*b*, 51*c* extend respectively in a plane of extension which has an angle of inclination a with respect to a plane of extension 250 of the upper face 25 of the main flap 23. As is particularly visible in the figures, the front ribs can be arranged relative to one another such that they extend in a common plane of extension 150 which has said inclination with respect to the plane of extension 20 of the upper face 25, namely the plane in which this upper face mainly extends. In an embodiment not shown, each front rib 53 of the deflection elements 51*a*, 51*b*, 51*c* extends in a plane of extension different from the other ribs 53.

The angle of inclination a is between 50° and 80°. The angle of inclination a is measured in the anticlockwise direction from the plane of extension 250 of the upper face 25 of the main flap 23 to the plane of extension 150 of the front ribs 53 viewed in projection in a plane perpendicular to the axis of rotation R of the main flap 23.

With reference to FIGS. 4, 5 and 6, each lateral rib 59, 63 of each deflection element 51*a*, 51*b*, 51*c* extends continuously from one of the ends of the front rib 53 to the vicinity of the second free edge 31 of the main flap 23 along an axis perpendicular to the axis of rotation R. In addition to what can have been mentioned previously, in the example illustrated, the lateral ribs 59, 63 of the deflection elements 51*a*, 51*b*, 51*c* are parallel to one another, within the same deflection element but also from one deflection element to another.

As can be seen in particular in FIG. 5, the lateral ribs 59, 65 of the deflection elements 51*a*, 51*b*, 51*c* have a length NI substantially greater than or equal to 80% of a length of the upper face 25 of the main flap 23. The length NI of a lateral rib is a distance measured along an axis perpendicular to the axis of rotation R, between one end of the lateral rib at the corresponding front rib and another, free, end of the lateral rib. The length L of the upper face 25 of the main flap 23 is the distance between the first free edge 29 and the second free edge 31 of the main flap 23 measured along an axis perpendicular to the axis of rotation R.

In an embodiment not shown, at least two lateral ribs each have a different length.

The central deflection element 51_b_ is interposed between the two end deflection elements 51_a_, 51_c_ along an axis parallel to the axis of rotation R. The deflection elements 51_a_, 51_b_, 51_c_ are placed at a distance from one another along an axis parallel to the axis of rotation R. In other words, the deflection elements are arranged next to one another along an axis parallel to the axis of rotation R and there is a space between two adjacent deflection elements.

From the features described above and with reference to FIG. 4, it will be appreciated that the main flap 23 has a plane of symmetry S perpendicular to the axis of rotation R of the main flap 23.

With reference to FIGS. 1-3, the distribution duct 9 extends between the mixing chamber 11 and the outlet openings 15_a_, 15_b_. The distribution duct 9 is configured to distribute the air coming from the mixing chamber to the outlet opening 15_a_, which supplies an upper channel 83 intended to bring one part of the air to a glazed surface, and/or the outlet opening 15_b_, which supplies a lower channel 81 intended to bring another part of the air to the feet of at least one user of said vehicle, whether they are seated in the front or the rear of the passenger compartment of the vehicle.

Distribution flaps 47, 49 are arranged in the distribution duct 9 to facilitate the distribution of the air coming from the mixing chamber 11 between the outlet openings 15_a_, 15_b_. The distribution flaps 47, 49 are configured to be rotatable so as to open or close, partially or completely, the passages between the mixing chamber 11 and the distribution duct 9, on the one hand, and/or the outlet openings 15_a_, 15_b_ on the other hand.

As can have been mentioned, the first end position A of the mixing device 21 shown in FIG. 1 corresponds to a request for hot air in the passenger compartment of the vehicle. All the air likely to enter the conveying duct 5 is directed toward the heating duct 7 in order to be heated by the heating device 19. The air can come into contact with the lower face 27 of the main flap 23 before being directed toward the heating duct 7 and does not come into contact with the upper face 25 of the main flap. The air thus heated is guided toward the mixing chamber 11.

The second end position B of the mixing device 21 shown in FIG. 2 corresponds to a request for unheated air in the passenger compartment of the vehicle. The mixing device 21 is in a configuration in which it is arranged at the inlet of the heating duct between the evaporator 17 and the heating device 19 such that all the air entering the conveying duct 5 is directed toward the mixing chamber. The air circulates in particular along the upper face 25 of the main flap 23 which contributes to delimiting the area for circulation of the air flow.

The intermediate position I of the mixing device 21 shown in FIG. 3 corresponds to a request for air which needs to be partially heated. Thus, after the air has passed through the evaporator, one part is guided into the mixing chamber 11 by the upper face 25 of the main flap 23 and another part is guided into the heating duct 7 in particular by the lower face 27 of the main flap 23. The part of the air coming into contact with the upper face 25 of the main flap 23 is deflected by the front ribs 53 of the deflection elements 51_a_, 51_b_, 51_c_, and this can, according to a first notable functional aspect, make it possible to route a portion of the air flow in a direction other than that guiding the air toward the mixing chamber, and in particular route part of the air flow directly toward the air outlet opening 15_a_ and the upper channel 83 dedicated to ventilation of a glazed surface, so as to continuously perform a demisting function. The deflection of the air flow owing to contact with the front ribs also makes it possible to generate a change in the flow of the air, which goes from laminar to turbulent, and this allows faster mixing with the part of the air which has passed through the heating duct 7. Furthermore, the presence of the front ribs and the lateral ribs extending these front ribs perpendicularly makes it possible to create air circulation corridors, of small size, in which the air flow is likely to rush and circulate at high speed. Consequently, the part of the air circulating along the upper face 25 arrives in the mixing chamber 11 more quickly, which again helps to facilitate mixing with the air present in the mixing chamber. Thus, the various air flows entering the mixing chamber mix quickly and the air flow which reaches the distribution duct 9 at the outlet of the mixing chamber has a uniform temperature. The change in temperature obtained according to the various positions of the flap is thus as smooth as possible.

Of course, the invention is not limited to the examples that have just been described, and numerous modifications can be made to these examples without departing from the scope of the invention.

What is claimed is:

1. An air thermal treatment device for a vehicle, comprising a casing including a conveying duct, a heating duct and a mixing chamber which are formed by walls of the casing and are configured to place at least one air inlet opening of the casing and at least one air outlet opening of the casing in aeraulic communication, the conveying duct extending from the at least one inlet opening to the mixing chamber, the heating duct extending parallel to the conveying duct as far as the mixing chamber, the air thermal treatment device further comprising a mixing device configured to be movable between a first end position which prevents the circulation of air between the conveying duct and the mixing chamber, and allows air to circulate in the heating duct, and a second end position which prevents air from circulating in the heating duct, the mixing device including a main flap adapted to be rotatable about an axis of rotation, wherein the mixing device further includes a deflection element protruding from an upper face of said main flap, the deflection element including at least one front rib lying in a plane including the axis of rotation and at least one lateral rib extending one end of the at least one front rib and lying in a plane perpendicular to the axis of rotation;

wherein the deflection element is remote from the periphery of the main flap.

2. The air thermal treatment device as claimed in claim 1, wherein the upper face of the main flap is configured to face the mixing chamber.

3. The air thermal treatment device as claimed in claim 1, wherein the main flap includes a first free edge extending parallel to the axis of rotation and being closer to the at least one air inlet opening than a second free edge of the main flap that is opposite the first free edge, and wherein the at least one front rib is in the vicinity of the first free edge of the main flap.

4. The air thermal treatment device as claimed in claim 3, wherein the at least one lateral rib extends continuously from the end of the at least one front rib to the vicinity of the second free edge of the main flap.

5. The air thermal treatment device as claimed in claim 4, wherein the main flap includes a shaft configured to allow rotation of the main flap about the axis of rotation and arranged between the first free edge and the second free edge of the main flap, the at least one lateral rib passing through the shaft viewed in projection in a plane including the axis of rotation.

6. The air thermal treatment device as claimed in claim 1, wherein a plane of extension of the at least one front rib has an angle of inclination with respect to a plane of extension of the upper face of the main flap.

7. The air thermal treatment device as claimed in claim 1, wherein the at least one lateral rib is a first lateral rib and wherein the deflection element includes a second lateral rib protruding from the upper face of the main flap, the second lateral rib extending another end of the front rib and lying in a plane perpendicular to the axis of rotation.

8. The air thermal treatment device as claimed in claim 1, wherein the main flap includes a plurality of deflection elements extending at a distance from one another along an axis parallel to the axis of rotation.

9. The air thermal treatment device as claimed in claim 8, wherein the plurality of deflection elements includes a central deflection element including a second lateral rib protruding from the upper face of the main flap, the second lateral rib extending another end of the front rib and lying in a plane perpendicular to the axis of rotation, said central deflection element being arranged centrally within the plurality of deflection elements.

10. The air thermal treatment device as claimed in claim 9, wherein the plurality of deflection elements includes at least two end deflection elements which each consist of at least one front rib and at least one lateral rib.

11. The air thermal treatment device as claimed in claim 8, wherein the width of each deflection element of the plurality of deflection elements is equal to or less than 25% of the width of the upper face of the main flap.

12. An air thermal treatment device for a vehicle, comprising a casing including a conveying duct, a heating duct and a mixing chamber, the conveying duct extending from at least one inlet opening to the mixing chamber, the heating duct extending parallel to the conveying duct as far as the mixing chamber, the air thermal treatment device further comprising a mixing device configured to be movable between a first end position which prevents circulation of air between the conveying duct and the mixing chamber, and allows air to circulate in the heating duct, and a second end position which prevents air from circulating in the heating duct, the mixing device including a main flap adapted to be rotatable about an axis of rotation, the mixing device further including a deflection element disposed remote from the periphery of the main flap and protruding from an upper face of the main flap, the deflection element including at least one front rib lying in a plane including the axis of rotation and at least one lateral rib extending one end of the at least one front rib and lying in a plane perpendicular to the axis of rotation.

13. The air thermal treatment device as claimed in claim 12, wherein the main flap includes a first free edge extending parallel to the axis of rotation and being closer to the at least one inlet opening than a second free edge of the main flap that is opposite the first free edge, and wherein the at least one front rib is in the vicinity of the first free edge of the main flap.

14. The air thermal treatment device of claim 13, wherein the main flap includes a shaft configured to allow rotation of the main flap about the axis of rotation and arranged between the first free edge and the second free edge of the main flap, the at least one lateral rib passing through the shaft viewed in projection in a plane including the axis of rotation.

15. The air thermal treatment device as claimed in claim 12, wherein a plane of extension of the at least one front rib has an angle of inclination with respect to a plane of extension of the upper face of the main flap.

16. The air thermal treatment device as claimed in claim 12, wherein the at least one lateral rib is a first lateral rib and wherein the deflection element includes a second lateral rib protruding from the upper face of the main flap, the second lateral rib extending another end of the front rib and lying in a plane perpendicular to the axis of rotation.

17. The air thermal treatment device as claimed in claim 12, wherein the width of the deflection element is equal to or less than 25% of the width of the upper face of the main flap.

18. A mixing device for use in an air thermal treatment device, the mixing device comprising:

- a main flap adapted to be rotatable about an axis of rotation;
- a deflection element disposed remote from the periphery of the main flap and protruding from an upper face of the main flap, the deflection element including at least one front rib lying in a plane including the axis of rotation and at least one lateral rib extending one end of the at least one front rib and lying in a plane perpendicular to the axis of rotation.

19. The mixing device of claim 18, wherein the main flap includes a plurality of deflection elements extending at a distance from one another along an axis parallel to the axis of rotation, the plurality of deflection elements including a central deflection element including a second lateral rib protruding from the upper face of the main flap, the second lateral rib extending another end of the front rib and lying in a plane perpendicular to the axis of rotation, the central deflection element being arranged centrally within the plurality of deflection elements.

20. The mixing device of claim 19, wherein the width of each deflection element of the plurality of deflection elements is equal to or less than 25% of the width of the upper face of the main flap.

* * * * *